United States Patent [19]

Garrett

[11] Patent Number: 4,639,340

[45] Date of Patent: Jan. 27, 1987

[54] DISSOLVING GAS IN A LIQUID

[75] Inventor: Michael E. Garrett, Woking, England

[73] Assignee: The BOC Group plc, Windlesham, England

[21] Appl. No.: 693,937

[22] Filed: Jan. 23, 1985

[30] Foreign Application Priority Data

Jan. 24, 1984 [GB] United Kingdom ............... 8401779

[51] Int. Cl.[4] .............................................. B01F 3/04
[52] U.S. Cl. ......................... 261/36.1; 261/DIG. 75; 261/DIG. 78; 55/257 R
[58] Field of Search .... 261/36 R, DIG. 78, DIG. 75; 55/257 R

[56] References Cited

U.S. PATENT DOCUMENTS

| 1,808,956 | 6/1931 | Ketterer | 261/DIG. 75 |
| 2,413,102 | 12/1946 | Ebert et al. | 261/DIG. 75 |
| 2,521,215 | 9/1950 | Haddeland et al. | 261/DIG. 75 |
| 3,400,818 | 9/1968 | Tarjan | 261/DIG. 75 |
| 3,778,038 | 12/1973 | Eversole et al. | 261/DIG. 78 |
| 4,124,660 | 11/1978 | Sterlini | 55/257 R |
| 4,163,712 | 8/1979 | Smith | 261/DIG. 75 |
| 4,483,826 | 11/1984 | Louthan | 261/DIG. 75 |

FOREIGN PATENT DOCUMENTS

| 1517502 | 11/1970 | Fed. Rep. of Germany ... 261/DIG. 78 |
| 95365 | 7/1922 | Switzerland ............... 261/DIG. 75 |
| 1455567 | 11/1976 | United Kingdom . |

OTHER PUBLICATIONS

Gas Dynamics, K. Oswatitsch, Academic Press, Inc., N.Y., 1956, QA-930-081gE, pp. 51-56, 577-585.

Primary Examiner—Tim Miles
Attorney, Agent, or Firm—David A. Draegert; Larry R. Cassett

[57] ABSTRACT

In order to dissolve a gas such as oxygen in a liquid, typically aqueous, a stream of liquid is taken from tank 2 by a pump 10 and pressurized thereby. Oxygen is introduced into the stream via a conduit 18 upstream of a venturi 20. The resulting mixture of oxygen bubbles and liquid is accelerated from a sub-sonic to a super-sonic velocity as it flows through the venturi 20. The resultant shockwave is effective to reduce the size of the bubbles. The stream of liquid carrying oxygen bubbles dispersed therein is then transported at sub-sonic velocity along the conduit 12 to a sparge pipe 14 through which it is introduced into the main volume 4 of liquid into the tank 2. As the liquid passes through the orifices of the sparge pipe 14 so it is again accelerated to a super-sonic velocity and another shockwave is created thereby causing the bubbles to reduce in size such that they readily dissolve in or are consumed by the main volume of liquid.

21 Claims, 2 Drawing Figures

DISSOLVING GAS IN A LIQUID

DESCRIPTION OF THE INVENTION

This invention relates to a method and apparatus for dissolving gas in liquid. The invention is particularly but not exclusively concerned with dissolving oxygen or a gas mixture including oxygen as one of its constituents in an aqueous or non-aqueous liquid.

Our U.K. patent specification No. 1 455 567 discloses a process for treating liquid, including the steps of taking a stream of the liquid, pressurising the stream, introducing a treatment gas into the pressurised stream so as to dissolve therein some of the gas, and introducing the stream containing dissolved and undissolved gas into a volume of the liquid under turbulent conditions such that the undissolved gas enters the volume of liquid in the form of fine bubbles that either dissolve or are consummed within the volume of liquid.

The method described in the aforesaid U.K. patent specification has been successful technically and commercially, particularly as a means of dissolving oxygen in waste water so as to improve the treatment of sewage. We attribute this success at least in part to the fact that the process permits such more gas to be retained in the body of the liquid than prior methods operating with the same power consumption. By using the stream as a carrier of gas bubbles a significantly higher quantity of gas can be successfully carried in the stream into the main volume of liquid and dissolved therein without pressurising that volume of liquid than if the amount of gas carried in the stream is merely limited to the theoretical amount needed to produce a fully saturated liquid at equilibrium. This result can be obtained without the need to introduce the stream into the main volume of liquid at the location under the large hydrostatic head.

We have nonetheless been looking to improve the efficiency of the method and apparatus described in our U.K. patent specification No. 1 455 567, and it is an aim of the present invention to provide such a method and apparatus for achieving this end.

Accordingly, there is provided a method of dissolving gas in a liquid, comprising the steps of pressurising a stream of liquid, introducing the gas into the stream, to dissolve therein some of the gas and to form a gas-liquid mixture travelling at a velocity less than that of sound in said mixture, accelerating the stream to a supersonic velocity to create a shockwave effective to reduce the size of the gas bubbles in the stream and thereby to form a dispersion of small gas bubbles in the liquid, reducing the velocity of the stream to below sonic velocity, transporting the stream as said dispersion of small gas bubbles in the liquid to at least one outlet in a volume of the liquid at a substantially lower pressure than that to which said stream is subjected, accelerating the stream at near to said outlet so as to create a second shockwave effective to reduce further the size of the gas bubbles, and introducing the stream through said outlet into the volume of liquid.

The invention also provides apparatus for dissolving gas in a liquid comprising means (e.g. a pump) for pressurising a stream of liquid, a vessel for holding a volume of liquid in which gas is to be dissolved, a conduit placing the outlet of the pressurising means in communication with at least one nozzle (or the like) for introducing the stream of pressurised liquid into the volume of liquid, a first restriction in said conduit, means for introducing gas into the conduit upstream of the restriction, whereby in operation a stream of a gas-liquid mixture is able to flow into the restriction at a velocity below that of sound in the mixture but is able to be accelerated to a supersonic velocity and hence to be subjected to a shockwave as it flows through the first restriction, the stream returning to a sub-sonic velocity after passing through a first restriction and a second restriction or restrictions associated with the nozzle for causing the liquid-gas mixture to be accelerated again to a supersonic velocity and hence to be subjected to a second shockwave as it leaves the nozzle.

It is found that by subjecting the dispersion mixture of gas in the liquid to two shockwaves in accordance with the invention, dissolution of the gas in the liquid is facilitated and for oxygen-water systems will be in the order of 50 feet per second. The first shockwave helps to break or shear the relatively coarse bubbles that are formed (on introduction of the gas into the liquid) into such finer bubbles that dissolve more readily. It is therefore possible to dissolve more gas in the stream flowing through the conduit than would otherwise be possible.

The first restriction is preferably provided by a venturi which is employed to return gas separated from the stream at a relatively downstream location to a relatively upstream location of the conduit.

The method and apparatus according to the present invention will now be described by way of example with reference to the accompanying drawings, in which.

Figure 1:
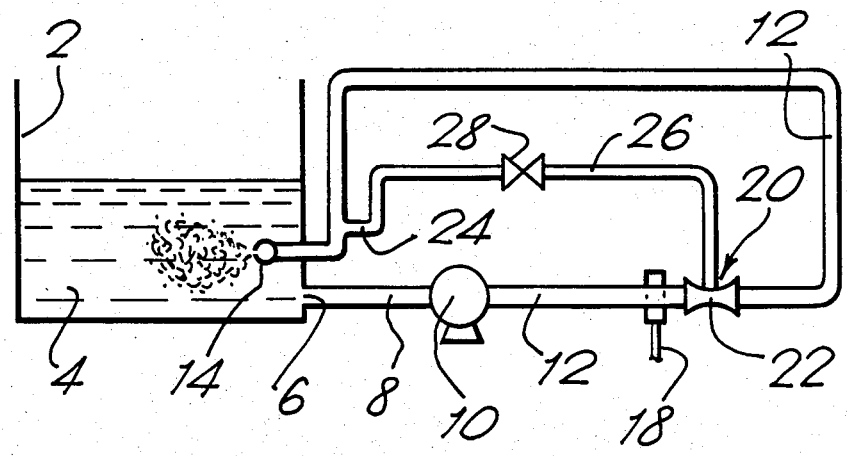
FIG. 1 is a schematic diagram illustrating an apparatus for oxygenating water having a biochemical oxygen demand.
Figure 2:
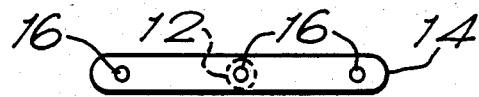
FIG. 2 is an end view of a sparge pipe forming part of the apparatus shown in FIG. 1.

Referring to FIGS. 1 and 2 of the accompanying drawings, an open topped tank 2 contains a volume 4 of waste water having a biochemical oxygen demand. Near its bottom, the tank 2 has an outlet 6 communicating with a pipe 8 which terminates at the inlet end of a pump 10 adapted to pressurise liquid flowing there through. The outlet of the pump 10 communicates with an elongate conduit 12 which terminates in a sparge pipe 14 located in the volume 4 of the liquid at a region near to the bottom and to one side thereof. The pipe 14 has a plurality of outlet orifices 16 which face towards the other side of the tank. Instead of the pipe 14, a single outlet nozzle may be employed.

An oxygen supply pipe 18 terminates in the conduit 16 at a region there of near to and downstream of the outlet of the pump 10. The oxygen is introduced into the stream flowing through the conduit 12 from the pipe 18. The oxygen is typically supplied from a source (not shown) at an elevated pressure sufficient to enable the oxygen to enter the pressurised stream. The source may be one or more cylinders of compressed, gaseous oxygen or a vacuum-insulated evaporator of liquid oxygen.

Downstream of the union of the pipe 18 and the conduit 12 is a venturi 20 having a throat 22. A conduit 26 terminates at one end in the throat 22 of the venturi 20 and at its other end in an outlet aperture 24 formed in the wall of the conduit 12 at a downstream region of the conduit 12 near to the pipe 14. In operation, flow of liquid through the venturi 20 causes a reduction in the static pressure at the throat 22 such that gas that disengages from the liquid and enters the conduit 26 is drawn along the conduit 26 in the direction of the venturi 20 and is introduced into the liquid flowing through the venturi 20. Typically, it is the larger bubbles of gas that disengage from the stream of liquid and enter the conduit 26. Thus, the dissolving efficiency is increased.

A flow control valve 28 is located in the pipe 26 and is manually adjustable to control the rate at which gas is recycled from the aperture 24 to the venturi 20. Typically the rate of recycle is selected to be from 20 to 60% of the rate at which gas is introduced into the conduit 12 from the pipe 18.

In order to start operation of the apparatus shown in FIG. 1, the pump 10 is energised and it withdraws a stream of water from the tank 2. The pump 10 is of the kind able to raise the pressure of the liquid passing there through to a pressure in the range 2 to 4 atmospheres absolute. Oxygen is then introduced from the pipe 18 into the pressurised stream leaving the pump 10 and flowing through the conduit 12. The oxygen is preferably added at a rate 2 to 10 times in excess of the equilisation value required to saturate the liquid in dissolved oxygen at the prevailing pressure in the conduit 12. Thus, the majority of the oxygen introduced through the conduit 18 into the stream 12 remains undissolved and a dispersion of relatively coarse bubbles of oxygen in water is formed immediately downstream of the union of the pipe 18 with the conduit 12. The velocity of the stream in this region of the conduit 12 is arranged to be less than that of the velocity of sound in the dispersion but sufficient for the gas bubbles to remain dispersed by turbulence. We have found that should the velocity be too low slug flow or even stratification will be created and such conditions must be avoided. The limiting value below which slug flow occurs can be determined empirically for any particular apparatus and is related to the size range of bubbles present. In general, the limiting value will not be less than about 2 meters per second. In the region between the upstream end and the throat 22 of the venturi 20, the velocity of the stream of gas-in-liquid dispersion increases and reaches a value in excess of the velocity of sound in the dispersion. Accordingly, a shockwave is created within the said region of the venturi 20. As a result, the relatively coarse bubbles of oxygen are sheared into smaller or finer bubbles by the turbulence resulting from the shockwave. This helps to dissolve a small additional amount of oxygen in the water.

After passing through the throat 22 of the venturi 20, the pressurised stream is decelerated as the venturi widens until it is returned to a sub-sonic velocity which is still sufficient to maintain the bubbles in dispersion in the stream. As the stream flows along the conduit 12, there is a further gradual dissolution of bubbles of oxygen in the water. The length of the conduit 12 is chosen to dissolve the optimum amount of gas in the stream having regard to the pressure drop that occurs along the conduit. As the stream passes through the orifices 16 of the sparge pipe 14 so it is once again accelerated to a velocity in excess of that of the velocity of sound in the dispersion. Accordingly, a second shockwave is created and this shockwave is effective to create large numbers of very small oxygen bubbles as the stream enters and mixes with the main volume 4 of water. The orifices 16 each typically have a diameter in the range 6 mm to 50 mm or more. A dispersion of oxygen bubbles in the water leaves each orifice 16 in the form of a divergent jet. Such is the size of the bubbles entering the main volume 4 of water and the turbulence created therein by sparging the stream of liquid through the orifices 16 that most of the remaining oxygen dissolves in the main volume of liquid or is consumed thereby without any substantial quantities of oxygen being discharged undissolved from the surface of the liquid in the tank 2. (It can be appreciated that the pressurising of the stream increases the amount of dissolved oxygen that can be held in equilibrium with undissolved oxygen in the stream and also creates kinetic energy in the stream which is utilised to help dissolve the bubbles of gas that are carried in the dispersion.) Typically, the size of gas bubbles entering the main body of liquid is in the range 0.01 to 0.15 mm.

By introducing the oxygen into the stream through the conduit 18 rather than at the throat 22 of the venturi 20 use is made of the shockwave created as the velocity of the dispersion of oxygen bubbles in water reaches a supersonic value. If all the oxygen were introduced into the pressurised stream through the throat 22 of the venturi 20 no shockwave is produced upstream.

As the stream flows along the conduit 12 where the outlet aperture 24 is located, there is a tendency for the liquid to flow in a straight line while the gas having relatively little momentum tends to disengage from the liquid (particularly the larger bubbles) and flow into the inlet of the conduit 26 at the side of the conduit 12. There is thus some disengagement of gas from the dispersion. Typically, the gas may carry with it a small or insubstantial amount of liquid entrained in the gas. The suction created by the venturi 20 is effective to draw this gas into the conduit 26 and hence into the throat 20 of the venturi 22. The valve 28 is set so as to limit the amount of oxygen that is recycled in this way to 20–60% of that introduced into the conduit 12 through the pipe 18. By so increasing the proportion of undissolved oxygen bubbles in the stream in that length of the conduit 12 between the outlet of the venturi 20 and the portion of the conduit 12 where the outlet 24 is located, the driving force for dissolving oxygen in the stream is increased and hence the overall power efficiency of dissolving oxygen can be increased. For optimum efficiency it may be possible to use a shorter length of conduit between the venturi 20 and the outlet 24 than if no such oxygen were recycled. Alternatively, the same amount of oxygen can be dissolved at a lower operating pressure in the pump 10. Typically, in the order of up to 5% to 10% or more of the electrical power required to operate the pump 10 may be so saved.

If desired, the union between the pipe 18 and the conduit 12 may comprise an annular chamber (not shown) circumscribing said conduit 12 and communicating therewith e.g. through orifices in the wall of the conduit. An analogous arrangement can be used to introduce gas from the pipe 26 into the throat of the venturi.

I claim:

1. A method of dissolving gas in a liquid comprising the steps of pressurising a stream of liquid, introducing the gas into the stream to dissolve some of the gas therein and to form a gas-liquid mixture travelling at a velocity less than that of sound in said mixture, accelerating the stream to a supersonic velocity to create a first shockwave effective to reduce the size of the gas bubbles in the stream and thereby to form a dispersion of small gas bubbles in the liquid, reducing the velocity of the stream to below sonic velocity, transporting the stream as said dispersion of small gas bubbles in the liquid to at least one outlet in a volume of the liquid at a substantially lower pressure than that to which said stream is pressurized accelerating the stream at near to said outlet so as to create a second shockwave effective to reduce further the size of the gas bubbles, and introducing the stream through said outlet into the volume of liquid.

2. A method as claimed in claim 1, wherein the outlet is submerged in the volume of liquid, and some of the gas carried in the stream is taken therefrom at a relatively downstream position and is returned to said stream at a relatively upstream position.

3. A method as claimed in claim 2, in which up to about 60% by volume of the gas originally introduced into the stream is taken therefrom and is returned to the relatively upstream position.

4. A method as claimed in claim 2, in which the gas is taken from the stream by being separated or disengaged therefrom.

5. A method as claimed in claim 2, in which said gas is oxygen.

6. A method as claimed in claim 2, in which said liquid is aqueous.

7. A method as claimed in claim 2, in which said relatively upstream position is defined by the throat of a venturi through which said stream flows.

8. A method as claimed in claim 7, in which there is a gas passage affording communication between said relatively downstream position and the throat of the venturi; whereby gas disengaging from said stream is drawn from said relatively downstream position into the throat of the venturi.

9. A method as claimed in claim 8, in which said passage is restricted.

10. A method as claimed in claim 2, wherein the said gas is introduced into the pressurised stream upstream of the said relatively upstream position.

11. A method as claimed in claim 10, wherein said first shockwave is created by passing the stream through a venturi.

12. A method as claimed in claim 11, wherein said second shockwave is created immediately upstream of the outlet.

13. Apparatus for dissolving gas in a liquid, comprising pump means for pressurizing a stream of the liquid, a vessel for holding a volume of liquid in which gas is to be dissolved, a conduit placing the outlet of the pump means in communication with at least one nozzle (or the like) for introducing the stream of pressurized liquid into the volume of liquid, a first restriction in said conduit, a second restriction downstream from said first restriction and associated with the nozzle, and means for introducing gas into the conduit upstream of the first restriction, wherein the pump means and the gas introduction means are sufficient that in operation a stream of a gas-liquid mixture flows into the restriction at a velocity below that of sound in the mixture but is accelerated to a supersonic velocity and hence subjected to a shockwave as it flows through the first restriction, the stream returning to a subsonic velocity after passing through the first restriction, and the liquid-gas mixture is accelerated again to a supersonic velocity and hence subjected to a second shockwave as it leaves the nozzle.

14. Apparatus as claimed in claim 13 wherein the vessel is open and the nozzle is submerged in the volume of liquid, and further comprising means for taking some of the gas from the stream at a relatively downstream position in the conduit, and means for returning said gas to the conduit at a relatively upstream position.

15. Apparatus as claimed in claim 14, in which to enable said gas to be separated and returned there is an outlet aperture for gas in the conduit at said downstream position and a pipe leading from the outlet aperture to the relatively upstream position of the conduit.

16. Apparatus as claimed in claim 15, in which said pipe terminates in a chamber circumscribing the throat of a venturi and communicating therewith, the said stream passing through the venturi in operation of the apparatus.

17. Apparatus as claimed in claim 15, in which said pipe contains a flow restriction.

18. Apparatus as claimed in claim 17, in which said flow restriction is defined by a flow control valve.

19. Apparatus as claimed in claim 15, in which said pipe terminates in the throat of a venturi through which the said stream flows in operation of the apparatus.

20. Apparatus as claimed in claim 19, in which said means for introducing said gas into the conduit communicates with the conduit upstream of the venturi.

21. Apparatus as claimed in claim 20, in which said means includes an annular chamber circumscribing said conduit and communicating therewith and with a source of the gas.

* * * * *